US005770298A

United States Patent [19]

Nakamura et al.

[11] Patent Number: 5,770,298

[45] Date of Patent: Jun. 23, 1998

[54] FIXING ROLL AND SILICONE GEL FOR USE THEREIN

[75] Inventors: Akito Nakamura; Yoshito Ushio, both of Chiba Prefecture, Japan

[73] Assignee: Dow Corning Toray Silicone Co., Ltd., Tokyo, Japan

[21] Appl. No.: 734,644

[22] Filed: Oct. 21, 1996

[30] Foreign Application Priority Data

Nov. 10, 1995 [JP] Japan .................................... 7-317214

[51] Int. Cl.$^6$ ........................................................ B32B 3/00

[52] U.S. Cl. ........................ 428/195; 428/391; 428/411.1; 428/447; 428/688; 428/906; 428/913; 219/216

[58] Field of Search .................................... 428/358, 391, 428/195, 688, 411.1, 913, 447, 906; 219/216

[56] References Cited

U.S. PATENT DOCUMENTS

| | | | |
|---|---|---|---|
| 4,839,893 | 6/1989 | Nakamura et al. .................... | 428/35.8 |
| 5,319,427 | 6/1994 | Sakurai et al. .......................... | 355/285 |

FOREIGN PATENT DOCUMENTS

| | | | |
|---|---|---|---|
| 0320533 | 12/1987 | European Pat. Off. ....... | G03G 15/20 |
| 0674245 A2 | 3/1995 | European Pat. Off. ....... | G03G 15/20 |

*Primary Examiner*—William Krynski
*Attorney, Agent, or Firm*—Paula J. Lagattuta

[57] ABSTRACT

A low durometer fixing roll comprising a roller shaft, a peelable organic resin layer established on the external circumferential surface of the roller shaft, and a silicone gel layer interposed between them. A silicone gel composition for use in a fixing roll, said gel composition comprising (A) an alkenyl-substituted organopolysiloxane, (B) an organohydrogenpolysiloxane, in a quantity sufficient to provide 0.1 to 5 moles of silicon-bonded hydrogen in component (B) per mole of alkenyl groups in component (A) and (C) a sufficient quantity of platinum catalyst for curing the silicone gel composition.

15 Claims, 1 Drawing Sheet

FIXING ROLL AND SILICONE GEL FOR USE THEREIN

BACKGROUND OF THE INVENTION

1. Field of the Invention

This invention relates to a fixing roll and to a silicone gel composition for use therein. More particularly, this invention relates to a low durometer fixing roll having a peelable organic resin layer established on the external circumferential surface of a roller shaft with a silicone gel layer interposed between them. This invention also relates to a silicone gel composition which is usable as the silicone layer of the fixing roll.

2. Description of the Related Art

Fixing rolls with a fluorine resin layer established on the external circumferential surface of a metal roller shaft with a silicone rubber layer interposed between them are of superior toner peelability and are used as fixing rolls for devices such as electronic copying machines, printers and facsimiles. (See Japanese Patent Application Early Disclosure No. 53-74436 (1978), Japanese Patent Application Early Disclosure No. 57-89785 (1982), Japanese Patent Application Early Disclosure No. 59-74578 (1984) and Japanese Patent Application Early Disclosure No. 59-52269 (1984).)

As the aforementioned devices have been made smaller and lighter as a result of these fixing rolls, silicone rubbers of comparatively low durometer have been used as the silicone rubbers for forming the silicone rubber layer. (See Japanese Patent Application Early Disclosure No. 7-207163 (1995).) Specifically, in spite of the fact that the thickness of the fixing roll is reduced due to decrease in the durometer of the fixing roll by use of silicone rubbers of comparatively low durometer, a suitable nip width can be obtained by low nip pressure, and, in turn, the aforementioned devices can be made smaller and lighter.

On the other hand, silicone rubber films are used instead of silicone rubber to form the silicone rubber layer for the purpose of decreasing the durometer of the fixing roll. (See Japanese Patent Application Early Disclosure No. 63-139380 (1988).) However, there has been the problem that fixing rolls in which silicone rubber films are used readily undergo permanent compression set due to nip pressure.

The inventors conducted intensive studies of the aforementioned problems, and, as a result, arrived at this invention. Specifically, the objectives of this invention are to provide a fixing roll of superior durability and low durometer with which a suitable nip width can be obtained at a low nip pressure in spite of the fact that the thickness of the fixing roll is decreased and to provide a silicone gel composition for making this fixing roll.

SUMMARY OF THE INVENTION

The fixing roll of this invention comprises a roller shaft, a peelable organic resin layer established on the external circumferential surface of the roller shaft, and a layer of cured silicone gel interposed between the roller shaft and the organic resin layer, the cured silicone gel having a penetration value, as measured according to JIS K 2207, of 30 to 200.

The present invention also relates to the fixing roll described above wherein the cured silicone gel is prepared by mixing a silicone gel composition comprising (A) an alkenyl-substituted organopolysiloxane having an average of at least two alkenyl groups per molecule; (B) an organohydrogenpolysiloxane having an average of at least two silicon-bonded hydrogen atoms per molecure, in a quantity sufficient to provide 0.1 to 5 moles of silicon-bonded hydrogen atoms in component (B) per mole of alkenyl groups in component (A); and (C) a sufficient quantity of platinum catalyst for curing the silicone gel composition; wherein the silicone gel composition is curable via an addition reaction and when so cured forms a silicone gel having a penetration value, as measured according to JIS K 2207, of 30 to 200. The present invention also relates to the silicone gel composition described above.

BRIEF DESCRIPTION OF THE DRAWING

We shall now present a detailed description of the fixing roll of this invention by reference to FIG. 1. The fixing roll of this invention is characterized in that the peelable organic resin layer 3 is established on the external circumferential surface of the roller shaft 1 with the silicone gel layer 2 interposed between them.

DETAILED DESCRIPTION OF THE INVENTION

Figure 1:
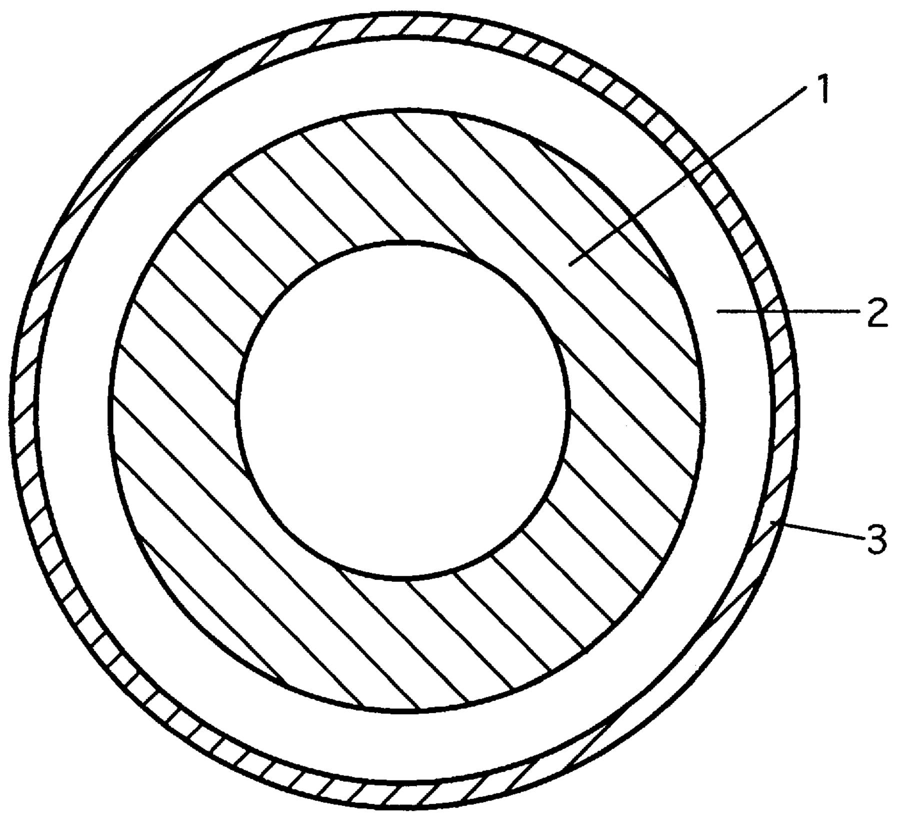

The roller shaft 1 can be made, for example, of iron, stainless steel, copper and aluminum. The organic resin that forms the peelable organic resin layer 3 may be, for example, fluorine resins such as polytetrafluoroethylene resin (PTFE), tetrafluoroethylene-perfluoroalkylvinyl ether copolymer resin (PFA), ethylene fluoride-polypropylene copolymer resin (FEP), tetrafluoroethylene-ethylene copolymer resins (ETFE), polychlorotrifluoroethylene copolymer resin (PCTFE), polyvinylidene fluoride resin (PVDF), polyvinyl fluoride resin (PVF) and ethylene trifluorochloride-ethylene copolymer resin (ECTFE), tetrafluoroethylene-hexafluoropropylene copolymer resin (FEP), fluorine rubbers such as vinylidene fluoride-hexafluoropropylene copolymer rubber (VDF-HFP), vinylidene fluoride-hexafluoropropylene-tetrafluoroethylene copolymer rubber (VDF-HFP-TFE) and tetrafluoroethylene-propylene copolymer rubber (TFE-Pr) and polyolefin resins such as polyethylene resins and polypropylene resins, with fluorine resins or fluorine rubbers being particularly preferred. The thickness of the peelable organic resin layer 3 should be less than 0.1 mm, and, preferably, 0.1 to 50 $\mu$m. The silicone gel that forms the silicone gel layer 2 is characterized in that the penetration as measured according to JIS K 2207 is 30 to 200. In preferred embodiments, the penetration is 50 to 150. This silicone gel should also have a compression set as measured according to JIS C 2123 of less than 15%. The thickness of the silicone gel layer 2 should be 2 to 30 mm.

The silicone gel composition that forms the silicone gel can include, for example, silicone gel compositions that are cured by addition reactions, silicone gel compositions that are cured by condensation reactions and silicone gel compositions that are cured by organic peroxides. Silicone gel compositions that are cured by addition reactions are desirable because the fixing roll can be manufactured efficiently. The silicone gel compositions that are cured by addition reactions should be silicone gel compositions comprised of (A) an alkenyl-substituted organopolysiloxane having at least two alkenyl groups per molecule; (B) an organohydrogenpolysiloxane having at least two silicon-bonded hydrogen atoms per molecule, in a quantity that provides 0.1 to 5 moles of silicon-bonded hydrogen atoms in component (B) per mole of alkenyl groups in component (A); and (C) a sufficient quantity of platinum catalyst for curing this composition.

The alkenyl-substituted organopolysiloxane comprising component (A) is the principal agent of this silicone gel composition and has an average of at least two alkenyl groups per molecule. The alkenyl groups in component (A) may be, for example, vinyl groups, allyl groups, butenyl groups, pentenyl groups, hexenyl groups and heptenyl groups. Vinyl groups and hexenyl groups are particularly preferred. The bond positions of the alkenyl groups in component (A) may be, for example, the terminals of the molecular chain and/or the side chains of the molecular chain. In order to minimize the compression set of the silicone gel, at least one alkenyl group should be bonded to a side chain of the molecular chain. Groups that are bonded to silicon atoms other than the alkenyl groups in component (A) may be, for example, alkyl groups such as methyl groups, ethyl groups, propyl groups, butyl groups, pentyl groups, hexyl groups and heptyl groups, aryl groups such as phenyl groups, tolyl groups, xylyl groups and naphthyl groups, aralkyl groups such as benzyl groups or phenethyl groups, alkyl halides such as chloromethyl groups, 3-chloropropyl groups and 3,3,3-trifluoropropyl groups and alkoxy groups such as hydroxyl groups, methoxy groups and ethoxy groups. Of these, methyl groups and phenyl groups are particularly preferred. The molecular structure of component (A) may be, for example, straight chain, straight chain having some branches, branched chain, cyclic or reticulate. Component (A) may be a single polymer having these molecular structures or it may be a mixture of polymers having these molecular structures. When the organohydrogenpolysiloxane comprising component (B) is essentially straight chain, component (A) should essentially be straight chain. The viscosity of component (A) at 25° C. should be, for example, 50 to 1,000,000 mPa.s, and, preferably, 100 to 100,000 mPa.s. When the viscosity of component (A) at 25° C. is less than 50 mPa.s, there is the possibility that the mechanical strength of the silicone gel that is obtained may be decreased. When it exceeds 1,000,000 mPa.s, there is the possibility that handling workability of the silicone gel composition that is obtained will be decreased.

The alkenyl-substituted organopolysiloxanes comprising component (A) may be, for example, dimethylsiloxane-methylvinylsiloxane copolymers both molecular chain terminals of which are blocked by trimethylsiloxy groups, methylvinyl polysiloxanes both molecular chain terminals of which are blocked by trimethylsiloxy groups, dimethylsiloxane-methylvinylsiloxane-methylphenylsiloxane copolymer both molecular chain terminals of which are blocked by trimethylsiloxy groups, methylvinylsiloxane-dimethylsiloxane-methyl (3,3,3-trifluoropropyl) siloxane copolymer both molecular chain terminals of which are blocked by trimethylsiloxy groups, methylvinylsiloxane-dimethylsiloxane copolymer both molecular chain terminals of which are blocked by silanol groups, methylvinyl polysiloxanes both molecular chain terminals of which are blocked by silanol groups, methylvinylsiloxane-dimethylsiloxane-methylphenylsiloxane copolymer both molecular chain terminals of which are blocked by silanol groups, methylvinylsiloxane-dimethylsiloxane-methyl (3,3,3-trifluoropropyl) siloxane copolymer both molecular chain terminals of which are blocked by silanol groups, dimethylpolysiloxanes both molecular chain terminals of which are blocked by dimethylvinylsiloxy groups, methylvinyl polysiloxanes both molecular chain terminals of which are blocked by dimethylvinylsiloxy groups, dimethylsiloxane-methylvinyl siloxane copolymer both molecular chain terminals of which are blocked by dimethylvinylsiloxy groups, dimethylsiloxane-methylvinylsiloxane-methylphenylsiloxane copolymer both molecular chain terminals of which are blocked by dimethylvinylsiloxy groups, dimethylpolysiloxanes both molecular chain terminals of which are blocked by dimethylhexenyl groups, organopolysiloxane copolymer comprised of siloxane units as indicated by the formula $R^1{}_3SiO_{1/2}$, siloxane units as indicated by the formula $R^1{}_2R^2SiO_{1/2}$ and siloxane units as indicated by the formula $SiO_{4/2}$, organopolysiloxane copolymer comprised of siloxane units as indicated by the formula $R^1{}_2R^2SiO_{1/2}$ and siloxane units as indicated by the formula $SiO_{4/2}$, organopolysiloxane copolymer comprised of siloxane units as indicated by the formula $R^1R^2SiO_{2/2}$, siloxane units as indicated by the formula $R^1SiO_{3/2}$ or siloxane units as indicated by the formula $R^2SiO_{3/2}$ and mixtures of two or more of these organopolysiloxanes. $R^1$ in these formulas is a monovalent hydrocarbon group other than an alkenyl group, including, for example, alkyl groups such as methyl groups, ethyl groups, propyl groups, butyl groups, pentyl groups, hexyl groups and heptyl groups, aryl groups such as phenyl groups, tolyl groups, xylyl groups and naphthyl groups, aralkyl groups such as benzyl groups and phenethyl groups and alkyl halide groups such as chloromethyl groups, 3-chloropropyl groups and 3,3,3-trifluoropropyl groups. In addition, $R^2$ in these formulas are alkenyl groups, including, for example, vinyl groups, allyl groups, butenyl groups, pentenyl groups, hexenyl groups and heptenyl groups.

The organohydrogenpolysiloxane comprising component (B) is the cross linking agent of the silicone gel composition and has an average of at least two silicon-bonded hydrogen atoms per molecule. The bond position of the silicon-bonded hydrogen in the molecule may be, for example, the molecular chain terminal and/or a side chain of the molecular chain. Groups that may be bonded with the silicon atoms other than the hydrogen atoms of component (B) include, for example, alkyl groups such as methyl groups, ethyl groups, propyl groups, butyl groups, pentyl groups, hexyl groups and heptyl groups, aryl groups such as phenyl groups, tolyl groups, xylyl groups and naphthyl groups, aralkyl groups such as benzyl groups and phenethyl groups and alkyl halides such as chloromethyl groups, 3-chloropropyl groups and 3,3,3-trifluoropropyl groups. Of these, methyl groups and phenyl groups are particularly preferred. The molecular structure of component (B) may be, for example, straight chain, straight chain having some branches, branched chain, cyclic or reticulate. Component (B) may be a single polymer having these molecular structures or it may be a mixture of polymers having these molecular structures. When component (A) is essentially straight chain, component (B) should essentially be straight chain. The viscosity of component (B) at 25° C. should be 1 to 500,000 mPa.s, and, preferably, 5 to 100,000 mPa.s. When the viscosity of component (B) at 25° C. is less than 1 mPa.s, it readily volatilizes and the structure of the silicone gel composition that is obtained may not be stable. When it exceeds 500,000 mPa.s, there is the possibility that handling workability of the silicone gel composition that is obtained will be decreased.

The organohydrogenpolysiloxanes comprising component (B) may be, for example, methylhydrogen polysiloxane both molecular chain terminals of which are blocked by trimethylsiloxy groups, dimethylsiloxane-methylhydrogen siloxane copolymer both molecular chain terminals of which are blocked by trimethylsiloxy groups, dimethylsiloxane-ethylhydrogensiloxane-methylphenylsiloxane copolymer both molecular chain terminals of which are blocked by trimethylsiloxy groups, dimethylpolysiloxane both molecular chain terminals of which are blocked by dimethylhydrogensiloxy groups, dimethylsiloxane-methylphenylsiloxane copolymer both molecular chain terminals of which are blocked by dimethylhydrogensiloxy groups, methylphenyl polysiloxane both molecular chain terminals of which are blocked by dimethylhydrogensiloxy groups, organopolysiloxane copolymer comprised of siloxane units as indicated by the formula $R^1{}_3SiO_{1/2}$, siloxane units as indicated by the formula $R^1{}_2HSiO_{1/2}$ and siloxane units as indicated by the formula $SiO_{4/2}$, organopolysiloxane copolymer comprised of siloxane units as indicated by the formula $R^1{}_2HSiO_{1/2}$ and siloxane units as indicated by the formula $SiO_{4/2}$, organopolysiloxane copolymer comprised of siloxane units as indicated by the formula $R^1HSiO_{2/2}$ and siloxane units as indicated by the formula $R^1SiO_{3/2}$ or siloxane units as indicated by the formula $HSiO_{3/2}$ and mixtures of two or more of these organopolysiloxanes. $R^1$ in these formulas is a monovalent hydrocarbon group other than an alkenyl group, including, for example, alkyl groups such as methyl groups, ethyl groups, propyl groups, butyl groups, pentyl groups, hexyl groups and heptyl groups, aryl groups such as phenyl groups, tolyl groups, xylyl groups and naphthyl groups, aralkyl groups such as benzyl groups and phenethyl groups and alkyl halide groups such as chloromethyl groups, 3-chloropropyl groups and 3,3,3-trifluoropropyl groups.

The quantity of component (B) that is compounded should be such that provides 0.1 to 5 moles of silicon-bonded hydrogen atoms in component (B) per mole of alkenyl group in component (A). A silicone gel composition in which there is less than 0.1 mole of silicon-bonded hydrogen atoms in component (B) per 1 mole of alkenyl group in component (A) does not cure sufficiently. Further, a silicone gel composition in which this amount exceeds 5 moles cures to a silicone gel having a reduced heat resistance.

The platinum catalyst comprising component (C) is a catalyst for the purpose of promoting curing of the silicone gel composition. The platinum catalyst comprising component (C) includes, for example, fine platinum powder, platinum black, platinum carried on fine silica powder, platinum carried on active carbon, chloroplatinic acid, alcohol solutions of chloroplatinic acid, complexes of platinum and olefins, complexes of platinum and alkenylsiloxanes and thermoplastic resin powders of particle diameters of less than 10 $\mu$m such as polystyrene resins, nylon resins, polycarbonate resins and silicone resins that contain these platinum catalysts.

The quantity of component (C) compounded is a quantity sufficient to cure the silicone gel composition. Practically, the platinum metal in component (C) in this silicone gel composition should be 0.1 to 1,000 ppm in terms of weight units. Quantities of 1 to 500 ppm are particularly preferred. When the platinum metal in component (C) in this silicone gel composition is less than 0.1 ppm in terms of weight units, curing of the silicone gel composition is markedly slowed. Silicone gel compositions in which the quantity exceeds 1000 ppm do not exhibit any particular improvement in curing capacity. Rather, there is the possibility that the silicone gel that is obtained may undergo coloration.

It is also desirable to compound a diorganopolysiloxane that is free of alkenyl groups and silicon-bonded hydrogen atoms with the silicone gel composition comprised of the aforementioned component (A) through component (C). This diorganopolysiloxane is a component for decreasing the durometer of the silicone gel and for increasing penetration as measured according to JIS K 2207. Groups that bind to the silicon atoms of the diorganopolysiloxane include, for example, alkyl groups such as methyl groups, ethyl groups, propyl groups, butyl groups, pentyl groups, hexyl groups and heptyl groups, aryl groups such as phenyl groups, tolyl groups, xylyl groups and naphthyl groups, aralkyl groups such as benzyl group and phenethyl groups and alkyl halide groups such as chloromethyl groups, 3-chloropropyl groups and 3,3,3-trichloropropyl groups. Of these, methyl groups and phenyl groups are particular preferred. These diorganopolysiloxanes are essentially straight chain and may also have some branched chains. It is preferred that the diorganopolysiloxane be liquid or rubbery with a viscosity at 25° C. greater than 100 mPa.s. It is particularly preferred that it be a liquid with a viscosity at 25° C. of 1,000 to 10,000,000 mPa.s because the handling workability of the silicone gel composition is superior and because it hardens and does not bleed from the silicone gel which is obtained. When the viscosity of the diorganopolysiloxane at 25° C. is less than 100 mPa.s, there is the possibility that it will bleed out of the silicone gel that is obtained.

This diorganopolysiloxane may be, for example, dimethylpolysiloxane both molecular chain terminals of which are blocked by trimethylsiloxy groups, dimethyl siloxane-methylphenyl siloxane copolymer both molecular chain terminals of which are blocked by trimethylsiloxy groups, dimethyl siloxane-methyl(3,3,3-trifluoropropyl)siloxane copolymer both molecular chain terminals of which are blocked by trimethylsiloxy groups, dimethylpolysiloxane both molecular chain terminals of which are blocked by silanol groups, dimethyl siloxane-methylphenyl siloxane copolymer both molecular chain terminals of which are blocked by silanol groups and mixtures of two or more of these diorganopolysiloxanes.

The quantity in which these diorganopolysiloxanes is compounded should be 5 to 200 parts by weight, and, preferably, 10 to 150 parts by weight, per 100 parts by weight of the aforementioned component (A). When the quantity of diorganopolysiloxane compounded is less than 5 parts by weight per 100 parts of component (A), the durometer of the silicone gel that is obtained may not be sufficiently lowered. When it exceeds 200 parts by weight, the diorganopolysiloxane may bleed from the silicone gel that is obtained.

Addition reaction controlling agents can be compounded as optional components with this silicone gel composition for the purpose of improving storage stability and handling workability. The addition reaction controlling agents can include acetylene compounds such as 3-methyl-1-buten-3-ol, 3,5-dimethyl-1-hexen-3-ol and 3-phenyl-1-buten-3-ol, enine compounds such as 3-methyl-3-buten-1-ine and 3,5-dimethyl-3-hexen-1-ine, triazoles such as 1,3,5,7-tetramethyl-1,3,5,7-tetravinylcyclotetrasiloxane and 1,3,5,7-tetramethyl-1,3,5,7-tetrahexenylcyclotetrasiloxane, phosphines, mercaptans and hydrazines. The quantity in which these cure controlling agents is added should be 0.001 to 5 parts by weight per 100 parts by weight of the aforementioned component (A).

Inorganic fillers can also be compounded as optional components with this silicone gel composition for the purpose of improving the mechanical strength, thermal conductivity and electroconductive properties of the silicone gel that is obtained. These inorganic fillers may include, for example, dry silica, wet silica, crystalline silica, aluminosilicates, iron oxide, zinc oxide, calcium carbonate, carbon black, alumina, aluminum hydroxide, silver and nickel. These inorganic fillers may be compounded without being treated or these inorganic fillers may be compounded after having been subjected to surface treatment in advance by an organic silicon compound such as an organoalkoxysilane, an organochlorosilane or an organodisilazane. In addition, these inorganic fillers may also be compounded while they are being subjected to surface treatment by an organic silicon compound in the aforementioned component (A). The quantity in which these inorganic fillers is compounded should be 5 to 500 parts by weight, and, preferably, 10 to 300 parts by weight, per 100 parts by weight of the aforementioned component (A). When the quantity of inorganic filler compounded is less than 5 parts by weight per 100 parts by weight of component (A), the mechanical strength of the silicone gel that is obtained may be diminished. When it exceeds 500 parts by weight, the handling workability of the silicone gel composition that is obtained may be decreased.

Six-membered ring compounds having carbon-nitrogen unsaturated bonds in the ring such as, for example, pyridine, pyrazine and 1,3,5-triazine, or derivatives thereof may be compounded in extremely small quantities with this silicone gel composition for the purpose of decreasing the compression set of the cured silicone gel that is obtained. In addition, as required, known pigments, heat resistance conferring agents and flame resistance conferring agents can be compounded with this silicone gel composition in ranges that do not impair the objective of this invention.

This silicone gel composition is obtained by uniform mixing of the aforementioned component (A) through component (C), and, as required, other optional components. A method that can be used to prepare this silicone gel composition is, for example, a method in which the aforementioned component (A) through component (C), and, as required, other optional components, are uniformly mixed with a known kneading apparatus such as double rollers, a kneader mixer or a "ROSS" mixer. "ROSS" is a registered trademark of Charles Ross & Sons Co. of Hauppauge, N.Y.

Methods for making the fixing roll of this invention using this silicone gel composition include, for example, a method in which the shaft of a metal roller is placed inside a mold for forming rollers and a peelable organic resin tube is then set in the inside wall of the mold for forming rollers, after which the silicone gel composition is introduced under pressure into the cavity between the roller shaft and the peelable organic resin tube and the silicone gel composition is cured and a method in which the shaft of a metal roller is placed inside a mold for forming rolls, after which the silicone gel composition is introduced under pressure and the silicone gel resin is cured, the peelable organic resin then being applied to the external circumferential surface of the silicone gel roller and being subjected to heat treatment. Of these, the former method is particularly preferred. The external circumferential surface of the roller shaft and/or the internal circumferential surface of the peelable organic resin tube may be treated with primer in advance in order to improve the adhesiveness between the roller shaft and the silicone gel layer and the adhesiveness between the silicone gel layer and the peelable organic resin layer. The method whereby silicone gel composition is introduced under pressure into the cavity of the roller shaft and the peelable organic resin tube may be, for example, using a compression molding machine, a transfer molding machine or an injection molding machine. When the curing temperature of the silicone gel composition is markedly low, the curing rate is slowed and the productivity of producing the fixing roll is markedly decreased. When the curing temperature is markedly high, wrinkles are formed on the surface of the fixing roll. For these reasons, the curing temperature should be in the range of 30° to 200° C., and, preferably, in the range of 50° to 150° C. Because the compression set of silicone gels obtained by curing at comparatively low temperatures is decreased, a further heat treatment at 150° to 250° C. should be performed.

The peelable organic resin layer is established on the external circumferential surface of the roller shaft of the fixing roll of this invention with the silicone gel layer interposed between them. For this reason, in spite of the fact that the fixing roll is thin and of low durometer, a suitable degree of nip width can be obtained even with a low nip pressure and superior durability is exhibited. Therefore, when this roller is used as a fixing roll in such devices as electronic copying machines, printers and facsimiles, these devices can be made even smaller and lighter.

EXAMPLES

We shall now describe the fixing roll of this invention in greater detail by means of examples. Viscosity in these examples is the value determined at 25° C. The silicone gel was evaluated as follows: The silicone gel composition was heated for 15 minutes at 120° C. with a heat pressing machine to form the silicone gel. This silicone gel was subjected to a further heating treatment for 4 hours at 200° C. in an oven. The penetration of the silicone gel was determined in accordance with JIS K 2207. JIS K 2207, *Petroleum Asphalts*; section 6.3, Testing Method of Penetration, was used. First, the sample was cooled to 25° C. Penetration was then measured using a Penetrometer that has a specified needle positioned perpendicular to the silicone gel and attached to a dropping apparatus. Penetration is expressed by the length the needle that penetrates the silicone gel in units of tenths of a millimeter. The compression set of the silicone gel was determined in accordance with the compression set test method in JIS C 2123. According to JIS C 2123, *Test Methods for Silicone Rubber Compounds for Electrical Applications*; section 10, Compression Set Testing, the silicone gel was set in a compression device and heat treated at 180° C. for 22 hours. Rate of compression set of the silicone gel was calculated using the following formula: $CS=100^*(t0-t1)/(t0-t2)$ where CS is the rate of compression set (%), t0 is the original thickness of the silicone gel in millimeters, t1 is the thickness of the silicone gel measured 30 minutes after it was taken out of the compression device in millimeters, and t2 is the thickness of a spacer in millimeters. In order to determine the volume resistivity of the gel, a cylindrical silicone gel sample of 30 mm in diameter and 12 mm in thickness was used as a test strip, loads were applied to it and the load during 20% compression was measured.

A fixing roll was made as indicated below. A commercially available primer was applied uniformly to the external circumferential surface of a cylindrical roller shaft of 10 mm in diameter made of iron, after which the roller shaft was allowed to stand for 30 minutes in an oven at 150° C., with the primer being thoroughly dried. A commercially available primer was applied uniformly to the inside face of a tube made of tetrafluoroethylene-perfluoroalkylperfluorovinyl ether copolymer of a film thickness of 50 μm, which inside face had been treated with an alkali, after which the tube was allowed to stand for 1 hour at room temperature, with the primer being thoroughly dried. Next, the roller shaft was placed inside a mold for forming rollers, the tube was placed on the inside wall of the mold and the silicone gel composition was introduced under pressure into the cavity between the roller shaft and the tube, after which these materials were cured for 30 minutes at 100° C., with a fixing roll coated with fluorine resin of 10 mm in thickness being made. Next, the fixing roll was subjected to heat treatment for 4 hours in an oven at 200° C.

Example 1

100 parts by weight of dimethylsiloxane-methylvinyl siloxane copolymer (vinyl group content=0.12 wt. %) of a viscosity of 40,000 mPa.s both molecular chain terminals of which were blocked by trimethylsiloxy groups as indicated by the formula (Chemical formula 1)

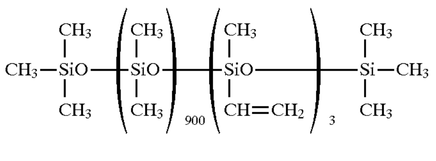

and 30 parts by weight of fine pulverized quartz powder of an average particle diameter of 5 μm were mixed uniformly with a "ROSS" mixer, after which 4 parts by weight of dimethylpolysiloxane (content of silicon-bonded hydrogen atoms=0.065 wt. %) of a viscosity of 38 mPa.s both molecular chain terminals of which were blocked by dimethylhydrogensiloxy groups as indicated by the formula (Chemical formula 2)

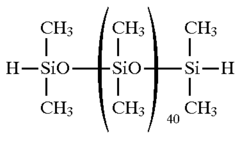

(the quantity of silicon-bonded hydrogen atoms in this dimethylpolysiloxane being 0.6 moles per 1 mole of vinyl groups in the aforementioned dimethylsiloxane-methylvinylsiloxane copolymer) and 0.5 parts by weight of an isopropyl alcohol solution of chloroplatinic acid (content of platinum metal=1 wt. %) were mixed uniformly, an addition reaction was performed and a cured silicone gel composition was prepared.

The penetration of the silicone gel obtained by curing this silicone gel composition was 55, its compression set was 5% and its compressive stress was 90 gf/cm$^2$.

A fixing roll coated with fluorine resin was made using this silicone gel composition. The JIS A durometer of the surface of this fixing roll was 15. This fixing roll was installed in an electronic copying machine and 150,000 copies were run using size A4 copying paper. There was no wrinkling or jamming of the paper and the images that were reproduced were sharp.

Comparative Example 1

100 parts by weight of dimethylsiloxane-methylvinyl siloxane copolymer (vinyl group content=0.12 wt. %) of a viscosity of 40,000 mPa.s both molecular chain terminals of which were blocked by trimethylsiloxy groups as indicated by the formula (Chemical formula 3)

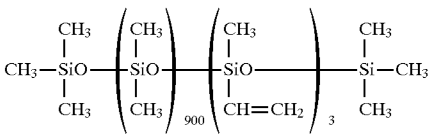

and 30 parts by weight of fine pulverized quartz powder of an average particle diameter of 5 μm were mixed uniformly with a "ROSS" mixer, after which 1.2 parts by weight of dimethylpolysiloxane-methylhydrogensiloxane copolymer (content of silicon-bonded hydrogen atoms=0.55 wt. %) of a viscosity of 10 mPa.s both molecular chain terminals of which were blocked by trimethylsiloxy groups as indicated by the formula (Chemical formula 4)

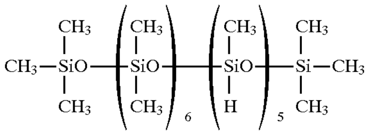

(the quantity of silicon-bonded hydrogen atoms in this dimethylpolysiloxane-methylhydrogensiloxane copolymer being 1.5 moles per 1 mole of vinyl groups in the aforementioned dimethylsiloxane-methylvinylsiloxane copolymer) and 0.5 parts by weight of an isopropyl alcohol solution of chloroplatinic acid (content of platinum metal=1 wt. %) were mixed uniformly, an addition reaction was performed and a cured silicone gel composition was prepared.

The penetration of the silicone gel obtained by curing this silicone gel composition was 7, its JIS A durometer was 15, its compression set was 5% and its compressive stress was 500 gf/cm$^2$.

A fixing roll coated with fluorine resin was made using this silicone gel composition. The JIS A durometer of the surface of this fixing roll was 30. This fixing roll was installed in an electronic copying machine and 150,000 copies were run using size A4 copying paper. There was no wrinkling or jamming of the paper and the images that were reproduced were sharp. However, extremely great nip pressure was necessary in order to obtain a suitable degree of nip width with this fixing roll.

Example 2

100 parts by weight of dimethylsiloxane-methylvinyl siloxane copolymer (vinyl group content=0.12 wt. %) of a viscosity of 40,000 mPa.s both molecular chain terminals of which were blocked by trimethylsiloxy groups as indicated by the formula (Chemical formula 5)

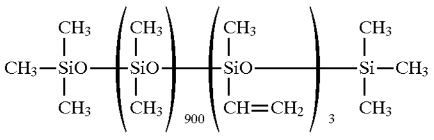

and 30 parts by weight of fine pulverized quartz powder of an average particle diameter of 5 μm were mixed uniformly with a "ROSS" mixer, after which 4 parts by weight of dimethylpolysiloxane (content of silicon-bonded hydrogen atoms=0.065 wt. %) of a viscosity of 38 mPa.s both molecular chain terminals of which were blocked by dimethylhydrogensiloxy groups as indicated by the formula (Chemical formula 6)

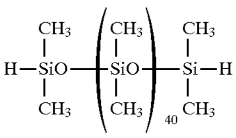

(the quantity of silicon-bonded hydrogen atoms in this dimethylpolysiloxane being 0.6 moles per 1 mole of vinyl groups in the aforementioned dimethylsiloxane-methylvinylsiloxane copolymer), 70 parts by weight of dimethylpolysiloxane of a viscosity of 300,000 mPa.s both molecular chain terminals of which were blocked by trimethylsiloxy groups and 0.5 parts by weight of an isopropyl alcohol solution of chloroplatinic acid (content of platinum metal=1 wt. %) were mixed uniformly, an addition reaction was performed and a cured silicone gel composition was prepared.

The penetration of the silicone gel obtained by curing this silicone gel composition was 78, its compression set was 6% and its compressive stress was 50 gf/$cm^2$.

A fixing roll coated with fluorine resin was made using this silicone gel composition. The JIS A durometer of the surface of this fixing roll was 12. This fixing roll was installed in an electronic copying machine and 150,000 copies were run using size A4 copying paper. There was no wrinkling or jamming of the paper and the images that were reproduced were sharp.

Example 3

100 parts by weight of dimethylsiloxane-methylvinyl siloxane copolymer (vinyl group content=0.12 wt. %) of a viscosity of 40,000 mPa.s both molecular chain terminals of which were blocked by trimethylsiloxy groups as indicated by the formula (Chemical formula 7)

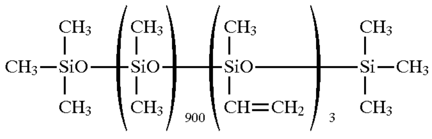

and 30 parts by weight of fine pulverized quartz powder of an average particle diameter of 5 $\mu$m were mixed uniformly with a "ROSS" mixer, after which 4 parts by weight of dimethylpolysiloxane (content of silicon-bonded hydrogen atoms=0.065 wt. %) of a viscosity of 38 mPa.s both molecular chain terminals of which were blocked by dimethylhydrogensiloxy groups as indicated by the formula (Chemical formula 8)

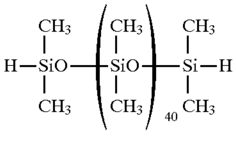

(the quantity of silicon-bonded hydrogen atoms in this dimethylpolysiloxane being 0.6 moles per 1 mole of vinyl groups in the aforementioned dimethylsiloxane-methylvinylsiloxane copolymer), 70 parts by weight of dimethylpolysiloxane of a viscosity of 300,000 mPa.s both molecular chain terminals of which were blocked by trimethylsiloxy groups, 30 parts by weight of dimethylpolysiloxane of a viscosity of 100,000 mPa.s both molecular chain terminals of which were blocked by trimethylsiloxy groups, 15 parts by weight of carbon black (Denka Acetylene Black manufactured by Denki Kagaku Kogyo Co., Ltd.) and 0.5 parts by weight of an isopropyl alcohol solution of chloroplatinic acid (content of platinum metal=1 wt. %) were mixed uniformly, an addition reaction was performed and a cured electroconductive silicone gel composition was prepared. The penetration of the silicone gel obtained by curing this electroconductive silicone gel composition was 80, its compression set was 10%, its volume resistivity was $1\times10^4$ $\Omega$ and its compressive stress was 45 gf/$cm^2$.

A fixing roll coated with fluorine resin was made using this electroconductive silicone gel composition. The JIS A durometer of the surface of this fixing roll was 11. This fixing roll was installed in an electronic copying machine and 150,000 copies were run using size A4 copying paper. There was no wrinkling or jamming of the paper and the images that were reproduced were sharp.

Example 4

100 parts by weight of dimethylsiloxane-methylvinyl siloxane copolymer (vinyl group content=0.12 wt. %) of a viscosity of 400,000 mPa.s both molecular chain terminals of which were blocked by trimethylsiloxy groups as indicated by the formula (Chemical formula 9)

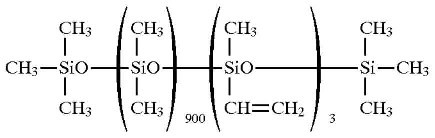

and 30 parts by weight of fine pulverized quartz powder of an average particle diameter of 5 $\mu$m were mixed uniformly with a "ROSS" mixer, after which 1.2 parts by weight of dimethyl siloxane-methylhydrogensiloxane copolymer (content of silicon-bonded hydrogen atoms=0.24 wt. %) of a viscosity of 10 mPa.s both molecular chain terminals of which were blocked by dimethylhydrogensiloxy groups as indicated by the formula (Chemical formula 10)

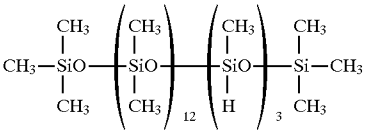

(the quantity of silicon-bonded hydrogen atoms in this dimethyl siloxane-methylhydrogensiloxane copolymer being 0.6 moles per 1 mole of vinyl groups in the aforementioned dimethylsiloxane-methylvinvlsiloxane copolymer), 130 parts by weight of dimethylpolysiloxane of a viscosity of 100,000 mpa.s both molecular chain terminals of which were blocked by trimethylsiloxy groups and 0.5 parts by weight of an isopropyl alcohol solution of chloroplatinic acid (content of platinum metal=1 wt. %) were mixed uniformly, an addition reaction was performed and a cured silicone gel composition was prepared.

The penetration of the silicone gel obtained by curing this silicone gel composition was 90, its compression set was 9% and its compressive stress was 40 gf/$cm^2$.

A fixing roll coated with fluorine resin was made using this silicone gel composition. The JIS A durometer of the surface of this fixing roll was 10. This fixing roll was installed in an electronic copying machine and 150,000 copies were run using size A4 copying paper. There was no wrinkling or jamming of the paper and the images that were reproduced were sharp.

Because a peelable organic resin layer is established on the external circumferential surface of the roller shaft of the fixing roll of this invention with a silicone gel layer formed by a silicone gel of a penetration of 30 to 200 as measured according to JIS K 2207 interposed between them, the fixing roll is characterized in that a suitable degree of nip width can be obtained even at a low nip pressure and there is superior durability in spite of the fact that it is of low durometer and thin. In addition, the silicone gel composition of this invention is characterized in that this type of fixing roll can be made with it.

FIG. 1 is a cross-sectional view of the fixing roll of this invention.

1 roller shaft

2 silicone gel layer

3 peelable organic resin layer

That which is claimed is:

1. A fixing roll comprising

A) a roller shaft;

B) a peelable organic resin layer established on the external circumferential surface of the roller shaft; and C) a layer of cured silicone gel interposed between the roller shaft and the peelable organic resin layer;

wherein the cured silicone gel has a penetration value, as measured according to JIS K 2207, of 30 to 200.

2. The fixing roll of claim 1 wherein the cured silicone gel has a compression set of less than 15%, as measured according to JIS C 2123.

3. The fixing roll of claim 1 wherein the layer of cured silicone gel has as a thickness of 2 to 30 mm.

4. The fixing roll of claim 1 wherein the cured silicone gel is prepared by curing a silicone gel composition that is curable via an addition reaction.

5. The fixing roll of claim 4 wherein the silicone gel composition comprises (A) an alkenyl-substituted organopolysiloxane having an average of at least two alkenyl groups per molecule;

(B) an organohydrogenpolysiloxane having an average of at least two silicon-bonded hydrogen atoms per molecule, in an amount sufficient to provide 0.1 to 5 moles of silicone-bonded hydrogen atoms in component (B) per 1 mole of alkenyl groups in component (A); and (C) a sufficient quantity of platinum catalyst for curing the silicone gel composition.

6. The fixing roll of claim 5 wherein the viscosity of component (A) is 50 to 1,000,000 mPa.s.

7. The fixing roll of claim 6 wherein the viscosity of component (A) is 100 to 100,000 mPa.s.

8. The fixing roll of claim 5 wherein the viscosity of component (B) is 1 to 500,000 mPa.s.

9. The fixing roll of claim 8 wherein the viscosity of component (B) is 5 to 100,000 mPa.s.

10. The fixing roll of claim 5, wherein the silicone gel composition further comprising a diorganopolysiloxane that is free of alkenyl groups and silicon-bonded hydrogen atoms.

11. The fixing roll of claim 10, wherein the diorganopolysiloxane has a viscosity that is greater than 100 mPa.s.

12. The fixing roll of claim 11, wherein the diorganopolysiloxane has a viscosity that is 1,000 to 10,000,000 mPa.s.

13. The fixing roll of claim 10, wherein the diorganopolysiloxane is present in an amount providing 5 to 200 parts by weight per 100 parts by weight of component (A).

14. The fixing roll of claim 1 wherein the peelable organic resin layer is formed of fluorine resin or fluorine rubber.

15. The fixing roll of claim 1 wherein the peelable organic resin layer has a thickness that is less than or equal to 0.1 mm.

* * * * *